United States Patent [19]

Johnson

[11] 4,212,229
[45] Jul. 15, 1980

[54] CONTROLLER FOR FLUID PRESSURE OPERATED DEVICES

[75] Inventor: Oliver W. Johnson, Chaska, Minn.

[73] Assignee: Eaton Corporation, Cleveland, Ohio

[21] Appl. No.: 954,519

[22] Filed: Oct. 25, 1978

Related U.S. Application Data

[63] Continuation-in-part of Ser. No. 875,714, Feb. 6, 1978, Pat. No. 4,167,893.

[51] Int. Cl.$^2$ ............................................. F15B 13/04
[52] U.S. Cl. .................................... 91/446; 91/467; 60/494; 137/596
[58] Field of Search ............... 60/384, 420, 427, 445, 60/452–494; 91/446, 467; 137/596, 596.13; 418/61 B

[56] References Cited

U.S. PATENT DOCUMENTS

| Re. 25,126 | 2/1962 | Charlson | 91/467 |
|---|---|---|---|
| 3,455,210 | 7/1969 | Allen | 91/446 |
| 3,815,477 | 6/1974 | Ailshie et al. | 91/530 |
| 3,971,216 | 7/1976 | Miller | 60/445 |
| 4,033,377 | 7/1977 | Johnson | 137/596 |
| 4,037,620 | 7/1977 | Johnson | 137/596 |
| 4,043,419 | 8/1977 | Larson et al. | 180/132 |
| 4,109,679 | 8/1978 | Johnson | 137/596.13 |

Primary Examiner—Edgar W. Geoghegan
Attorney, Agent, or Firm—R. J. McCloskey; J. Yakimow; L. Kasper

[57] ABSTRACT

A controller for fluid pressure operated devices such as vehicle power steering systems. The controller is of the type having a primary, rotatable valve member and a follow-up valve member and including a fluid meter having a metering member coupled to the follow-up valve member. The valving defines a central reference plane perpendicular to the axis of rotation of the valving and the various ports and passages defined by the primary and follow-up valve members are generally oppositely and equally disposed about the central reference plane. This valving symmetry reduces internal leakage and steering wheel precession. The controller includes a load signal circuit, including a pair of load sensing grooves oppositely and equally disposed about the central plane. The valving defines various neutral orifices and operating orifices communicating with the load signal circuit resulting in different load signal levels when the valving is in neutral, when the valving is in the normal operating position, and when it is fully actuated.

15 Claims, 14 Drawing Figures

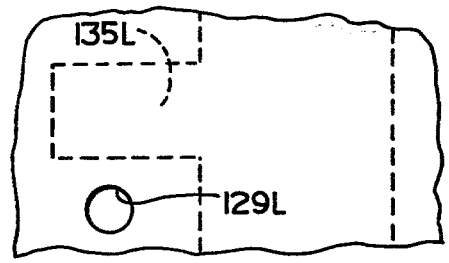
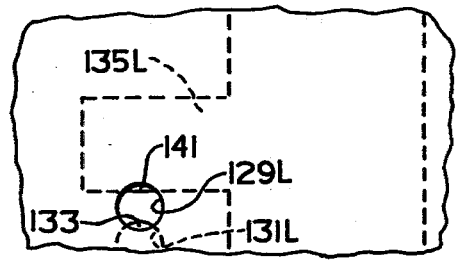
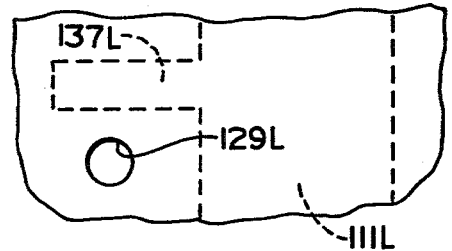
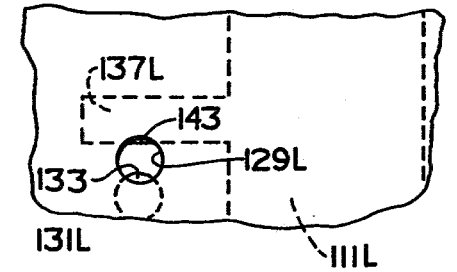
FIG. 11A
FIG. 11B
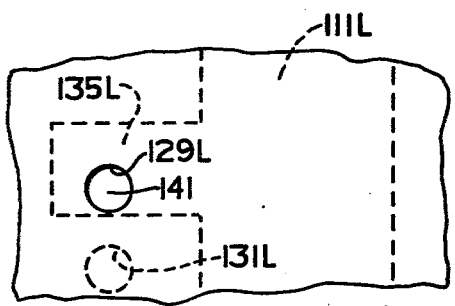
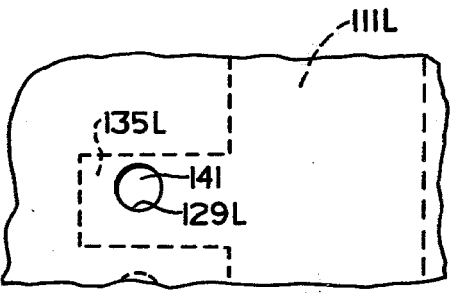
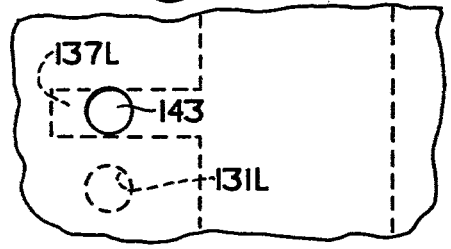
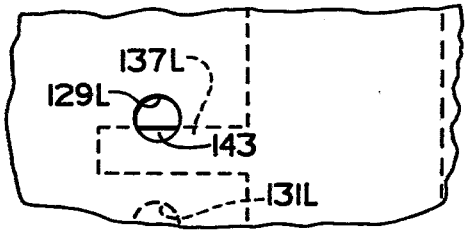
FIG. 11C
FIG. 11D

CONTROLLER FOR FLUID PRESSURE OPERATED DEVICES

CROSS REFERENCE TO RELATED APPLICATION

This application is a continuation-in-part of U.S. Application Ser. No. 875,714, filed Feb. 6, 1978 now U.S. Pat. No. 4,167,393 issued Sept. 18, 1979.

BACKGROUND OF THE DISCLOSURE

The present invention relates to load sensing fluid controllers, and more particularly, to such controllers in which the load signal level is capable of changing, depending upon the deflection of the controller valving.

It will become apparent to those skilled in the art that the present invention may be used advantageously with any type of fluid controller which is operable to control the flow of fluid from a source of pressurized fluid to a fluid operated device, wherein the source of fluid includes pressure responsive means for varying the delivery of fluid to the controller. However, the present invention is especially useful when applied to controllers such as the steering control unit of a full fluid-linked vehicle steering control system, and the invention will be described in connection therewith.

Several trends in the development of hydraulic steering control units (SCU's) are relevant to the present invention. First, as in hydraulics generally, the use of load sensing is becoming increasingly important for reasons which are now well known to those skilled in the art, such as minimizing the amount of energy consumed by the source of pressurized fluid (the pump). Second, in regard to full fluid-linked steering specifically, SCU's of the type described herein are being used on increasingly larger vehicles, thus requiring greater flow capacities.

A typical SCU, of the type to which the present invention relates, includes valving, a fluid meter, and an arrangement for imparting follow-up movement to the valving in synchronism with the flow through the fluid meter. The flow through the SCU is directly proportional to the flow area of the main flow control orifice (which is proportional to the rate at which the steering wheel is rotated), and is also proportional to the square root of the pressure drop across the main flow control orifice. As a result, increasing the flow capacity of an SCU has necessitated increasing the flow area of the various valving passages and orifices and, as the result, increasing the overall size of the SCU.

Attempts have also been made to increase the flow capacity of the SCU by increasing the pressure drop across the main flow control orifice. This provides a satisfactory flow rate at the higher valve deflections, but results in an excessive flow and gain rate through the valving for lower valve deflections. Increasing the pressure drop across the main flow control orifice also increases the standby pressure delivered to the SCU, increasing the potential for leakage through a closed center SCU (causing vehicle "drift"), and wasting pump energy.

It is known in the load sensing directional spool valve art to overcome the latter problem by communicating the load signal with tank when the valve is in neutral and bleeding signal fluid through a synthetic signal generator and into the main flow path, downstream of the main flow control orifice, when the valve is shifted from neutral. See U.S. Pat. Nos. 3,815,477 and 3,971,216. Thus, the prior art provides a relatively lower load signal when the valve is in neutral, and a relatively higher load signal when the valve is away from neutral, anywhere in its operating range.

Another problem associated with fluid controllers of the type to which this invention relates is steering wheel "precession", i.e., the position of the steering wheel corresponding to the neutral position of the controller "precesses" or moves slowly in one direction or the other during operation of the system. Another problem relates to internal leakage, within the valving, between "metered" and "unmetered" fluids. These and several other related problems have been largely overcome by the "symmetrical" valving arrangements for fluid controllers disclosed and claimed in U.S. Pat. Nos. 4,033,377 and 4,109,679, assigned to the assignee of the present invention. The fluid controller of the present invention utilizes the valve symmetry disclosed in the above-cited patents.

SUMMARY OF THE INVENTION

Accordingly, it is an object of the present invention to provide a fluid controller of the type described hereinafter which provides a substantially greater differential operating pressure at higher valve deflections, without an undesirable increase in the standby pressure when the valve is in neutral, or an undesirable increase in the differential operating pressure at the lower valve deflections.

The above and other objects of the present invention are accomplished by the provision of an improved fluid controller of the type comprising a housing means and a valve means including a primary valve member and a follow-up valve member, the valve members defining a neutral position and a central reference plane. The primary and follow-up valve members cooperate with the housing to define a first plurality of fluid passages when the valve members are relatively displaced in one direction from the neutral position and a second plurality of fluid passages when the valve members are relatively displaced in the other direction from neutral. The first and second pluralities of fluid passages provide substantially the same restriction to fluid flow in either direction of relative displacement. The first and second pluralities of fluid passages include first and second main flow control orifices, each having a substantially zero flow area when the valve members are in neutral, and an increasing flow area as the valve members are displaced from neutral. The valve means and the housing cooperate to define a load signal chamber in fluid communication with a load signal port. The controller includes a means operable to communicate fluid pressure from upstream of the first and second main flow control orifices to the load signal chamber. The valve means includes means to variably restrict the flow of fluid from the load signal chamber to the first plurality of fluid passages, downstream of the first main flow control orifice, when the valve members are relatively displaced in one direction, and to the second plurality of fluid passages, downstream of the second main flow control orifice, when the valve members are relatively displaced in the other direction.

In accordance with another aspect of the present invention, the load signal chamber includes first and second load sensing grooves defined by the housing and the follow-up valve member, the first and second load sensing grooves being oppositely and approximately equally disposed about the central reference plane.

BRIEF DESCRIPTION OF THE DRAWINGS

FIGS. 11A, B, C, and D are enlarged, fragmentary valve overlays, similar to FIG. 1, illustrating various relative positions of the valve members.

DESCRIPTION OF THE PREFERRED EMBODIMENT

Figure 1:
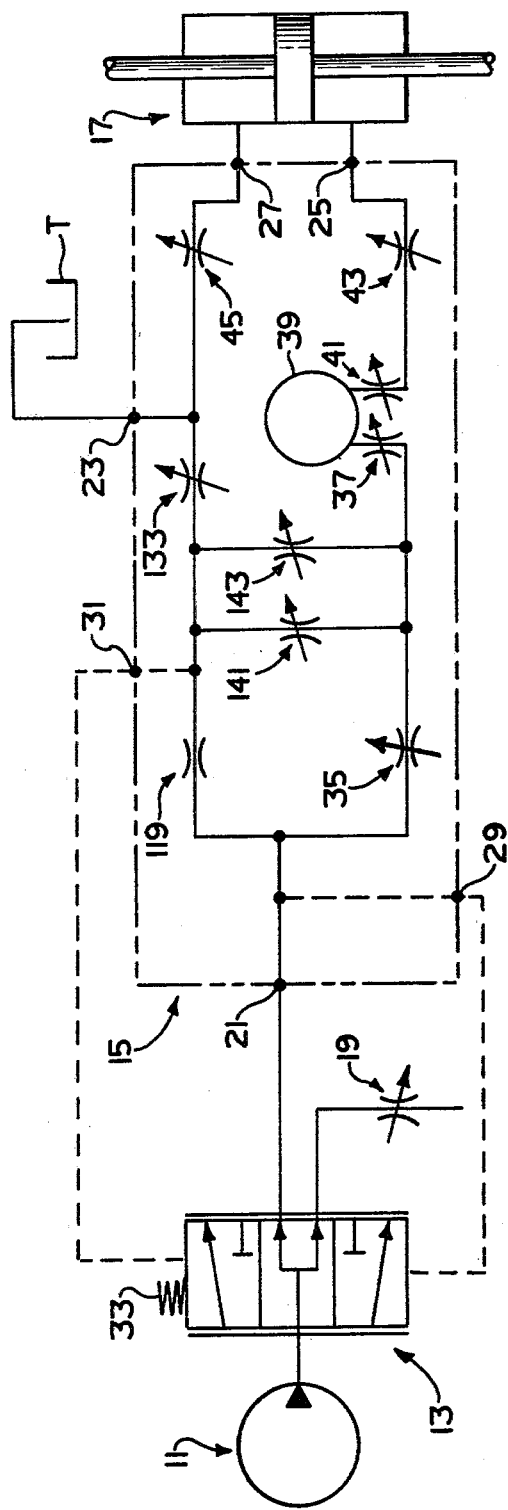
FIG. 1 is a schematic of a hydraulic system including a controller made in accordance with the present invention.

Referring now to the drawings, which are not intended to limit the invention, FIG. 1 is a schematic of a hydraulic system including a fluid controller made in accordance with the teachings of the present invention. The system includes a fluid pump 11 and a pilot operated, priority flow control valve 13. The control valve 13 apportions the flow of fluid from the pump 11 between (1) a primary circuit including a fluid controller, generally designated 15, and a fluid operated motor 17, and (2) an auxiliary circuit, represented herein by a variable orifice 19. Preferably, when the pump 11 is of the fixed displacement type, as shown herein, the auxiliary circuit should be of the opencenter type.

Controller

The fluid controller 15 includes an inlet port 21, a return port 23 and a pair of control (cylinder) ports 25 and 27 which are connected to the opposite ends of the fluid motor 17. The controller 15 further includes a pressure port 29 and a load signal port 31 as will be described in greater detail subsequently.

The priority flow control valve 13 may be of the type illustrated in U.S. Pat. No. 3,455,210, assigned to the assignee of the present invention, and incorporated herein by reference. The control valve 13 is biased by a pressure signal from the pressure port 29 toward a position permitting substantially all fluid to flow to the auxiliary circuit 19. At the same time, the control valve 13 is biased by a compression spring 33 and by a pressure signal from the load signal port 31 toward a position permitting substantially all fluid to flow to the primary circuit.

The fluid controller 15, shown in greater detail in FIGS. 2-6, may be of the type illustrated and described in U.S. Pat. No. Re. 25,126, assigned to the assignee of the present invention, and incorporated herein by reference. During a steering operation, the fluid controller 15 defines a fluid flow path communicating between the inlet port 21 and the control port 25. This fluid flow path includes a main flow control orifice 35, and a second variable orifice 37, through which fluid is communicated to a fluid meter 39. Metered fluid passes through a third variable orifice 41, and a fourth variable orifice 43 to the control port 25. Fluid displaced by the motor 17 returns through the control port 27 and flows through a fifth variable orifice 45 to the tank port 23, and then to a fluid reservoir or tank T.

Figure 2:
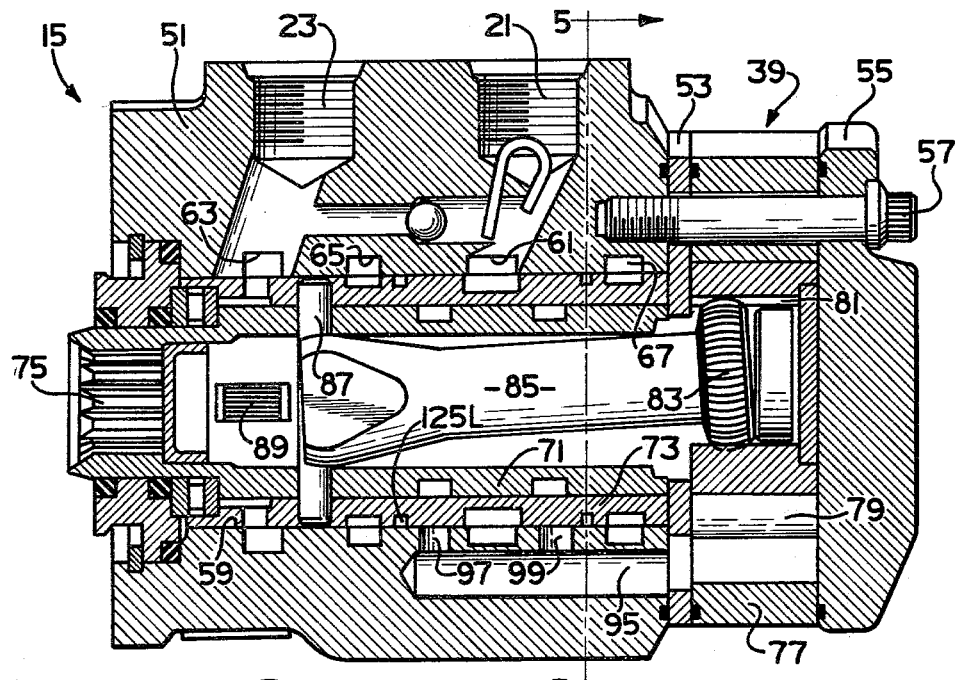
FIG. 2 is an axial cross section of a controller of the type to which the present invention relates.

Referring now to FIG. 2, the fluid controller 15 will be described only briefly in view of the incorporation herein of the previously referenced Re. 25,126. The controller 15 comprises several sections including a valve housing 51, a port plate 53, the fluid meter 39, and an end cap 55. These sections are held together in tight sealing engagement by means of a plurality of bolts 57, in threaded engagement with the valve housing 51. The housing 51 defines the fluid inlet port 21, the fluid return port 23, and the control fluid ports 25 and 27 (not shown in the plane of FIG. 2). The valve housing 51 defines a cylindrical valve bore 59, an annular groove 61 communicating with the fluid inlet port 21, an annular groove 63 communicating with the fluid return port 23, and a pair of annular grooves 65 and 67, communicating with the control ports 25 and 27, respectively.

Rotatably disposed within the valve bore 59 is the controller valving comprising a primary, rotatable valve member (spool) 71, and a cooperating, relatively rotatable follow-up valve member (sleeve) 73. At the forward end of the spool 71 is a portion having a reduced diameter, and defining a set of internal splines 75 which provide for a direct mechanical connection with a steering wheel (not shown), as is well known in the art. The spool 71 and sleeve 73 will be described in greater detail subsequently.

The fluid meter 39 may be of any suitable construction, but in the subject embodiment, it comprises a gerotor gear set including an internally toothed stator 77 and an externally toothed rotor 79. The rotor 79 defines a set of internal splines 81, and in splined engagement therewith is a set of external splines 83 formed on the rearward end of a drive shaft 85, the shaft 85 having a bifurcated forward end permitting a driving connection between the shaft 85 and the sleeve 73 by means of a pin 87. Thus, pressurized fluid flowing through the valving in response to turning of the spool 71 flows to the fluid meter 39, causing orbital and rotational movement of the rotor 79 within the stator 77. Such movement of the rotor 79 causes follow-up movement of the sleeve 73 by means of the drive shaft 85 and pin 87, to maintain an appropriate relative displacement between the spool 71 and sleeve 73, corresponding to a particular rate of rotation of the steering wheel. A plurality of leaf springs 89, extending through openings 91 in the spool 71, and through openings 93 in the sleeve 73, urges the sleeve 73 toward the neutral position, relative to spool 71.

The valve housing 51 defines a plurality of axially-extending bores 95, each of which communicates through an opening in the port plate 53 with one of the expanding or contracting volume chambers defined by the toothed interaction of the stator 77 and rotor 79. Communicating between each of the axial bores 95 and the valve bore 59 is a pair of meter passages 97 and 99, which function in association with the valving in a manner to be described subsequently.

Figure 8:
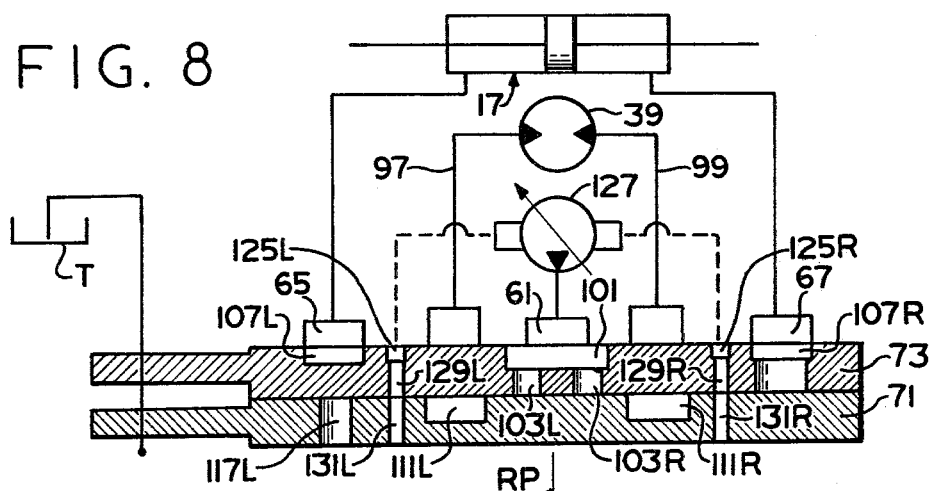
FIG. 8 is a view, partly in schematic, and partly in axial cross section, taken on line 8—8 of FIG. 7.
Figure 7:
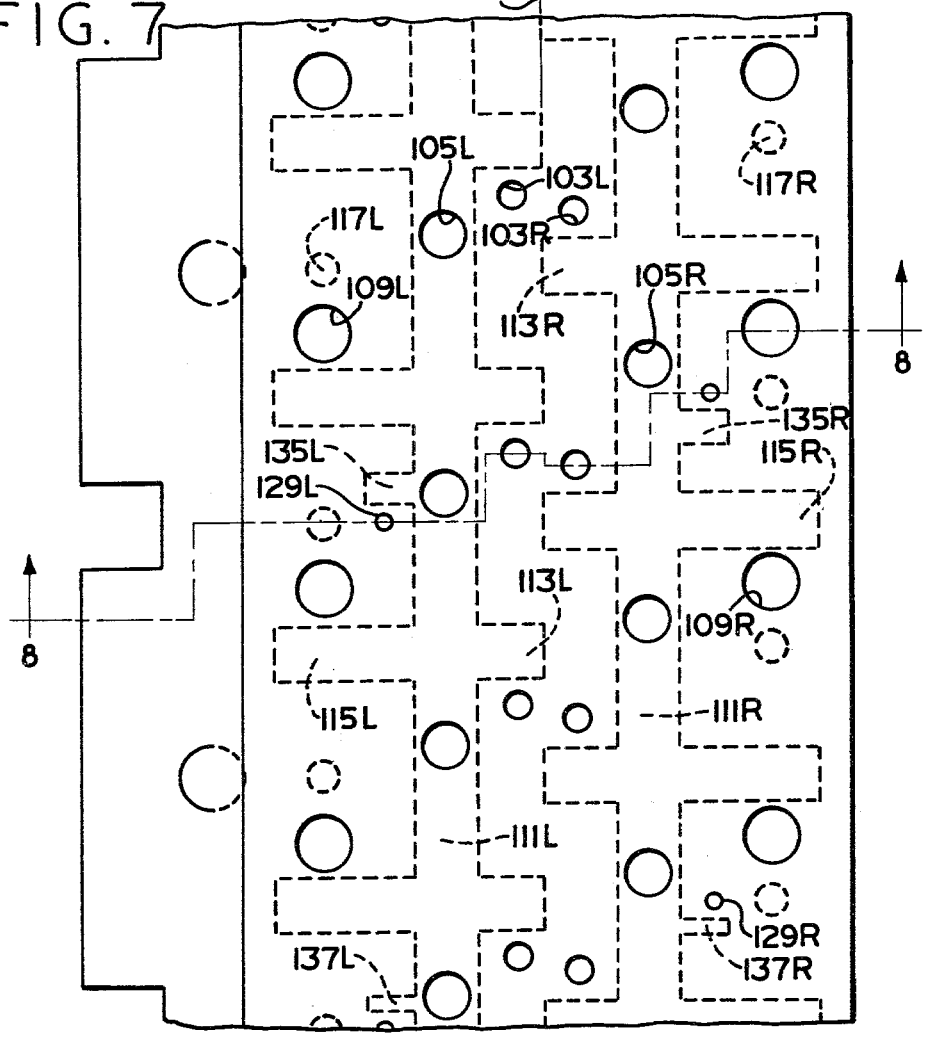
FIG. 7 is a fragmentary overlay of the valve members of the present invention in the neutral position.
Figure 10:
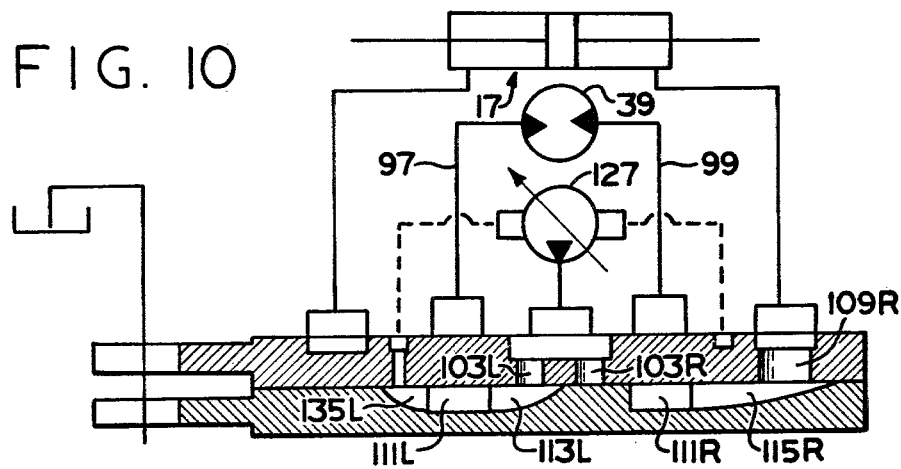
FIG. 10 is a view, partly in schematic, and partly in axial cross section, taken on line 10—10 of FIG. 9.
Figure 9:
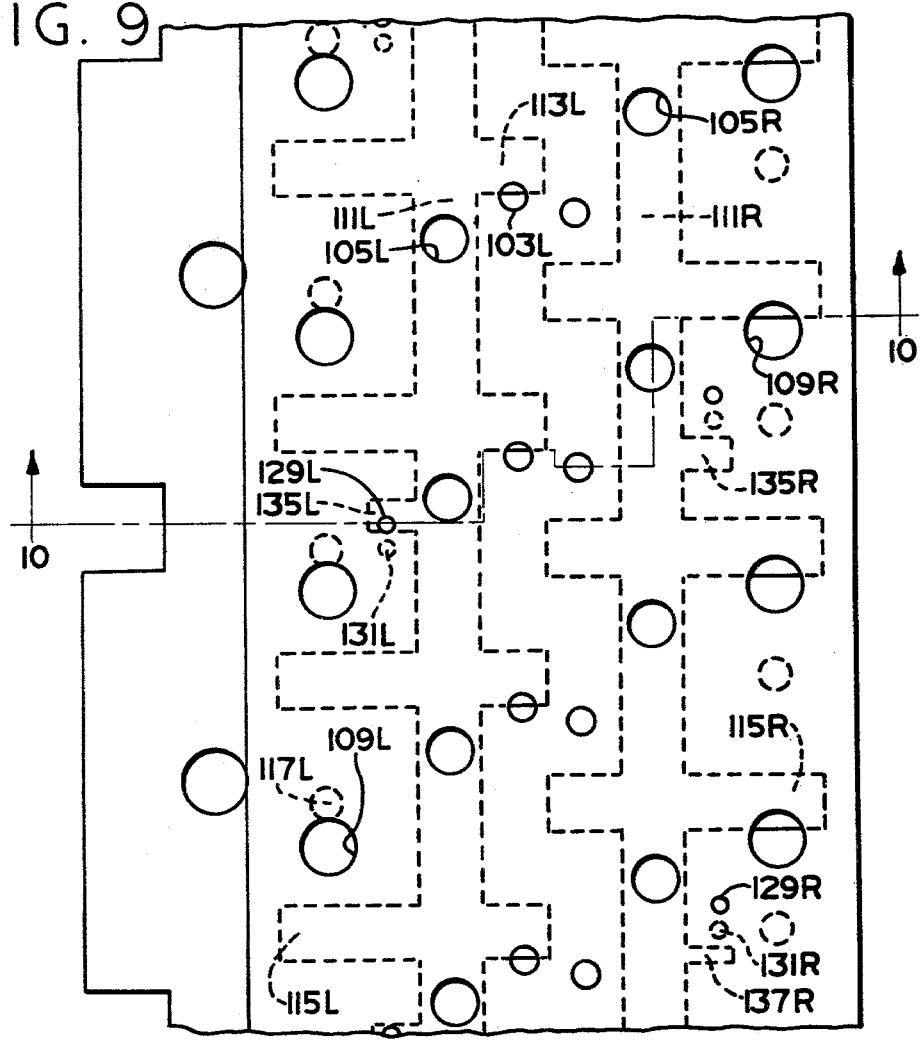
FIG. 9 is a fragmentary overlay of the valve members of the present invention in the normal operating position.

In connection with the subsequent description of the spool 71 and sleeve 73 in FIGS. 3, 4, 7, 8, 9, and 10, it should be noted that many of the ports, passages, etc. are arranged oppositely with respect to a central reference plane RP. Therefore, such elements will be described by a reference numeral followed by either an R or an L to indicate that the element is located on the right side or the left side, respectively, of the reference plane RP. On the other hand, certain of the elements do not have a corresponding element oppositely disposed about the reference plane RP and will be referred to by use of a reference numeral alone. Furthermore, it should be understood that the overlay views of FIGS. 7 and 9 are intended to illustrate the interface between the spool 71 and sleeve 73 and, as a result, do not show the various annular grooves formed about the outer periphery of the sleeve 73. Such annular grooves may, however, be seen in corresponding FIGS. 4, 8, and 10. It should be noted that in the overlay views of FIGS. 7 and 9, dashed lines show ports and passages in the valve spool 71, while solid lines illustrate ports in the valve sleeve 73.

Formed in the outer surface of the valve sleeve 73 is a circumferential groove 101, which is in continuous fluid communication with the fluid inlet port 21 through the annular groove 61. Opening into the circumferential groove 101 is a plurality of pressure ports 103L and 103R, which are disposed generally adjacent the central reference plane RP. In the subject embodiment, the "pressure port means" is illustrated as comprising a pair of ports (103L and 103R), for reasons which will be discussed subsequently, but it should be understood that as used hereinafter, the term "pressure port means" is intended to means and include a single port, or two or more ports disposed together and adjacent the central reference plane RP. In the subject embodiment, there are shown four pairs of the pressure ports 103L and 103R.

Equally and oppositely disposed about the reference plane RP is a plurality of meter ports 105L, and a plurality of meter ports 105R. The meter ports 105L are disposed for commutating fluid communication with the meter passages 97, while the meter ports 105R are disposed for commutating fluid communication with the meter passages 99. Equally and oppositely disposed about the reference plane RP, and further therefrom than the meter ports 105L and 105R, respectively, is a pair of circumferential grooves 107L and 107R, disposed for continuous fluid communication with the annular grooves 65 and 67, respectively. Communicating between the circumferential groove 107L and the interior of the sleeve 73 is a plurality of operating ports 109L, and communicating between the circumferential groove 107R and the interior of the sleeve 73 is a plurality of operating ports 109R.

Figure 3:
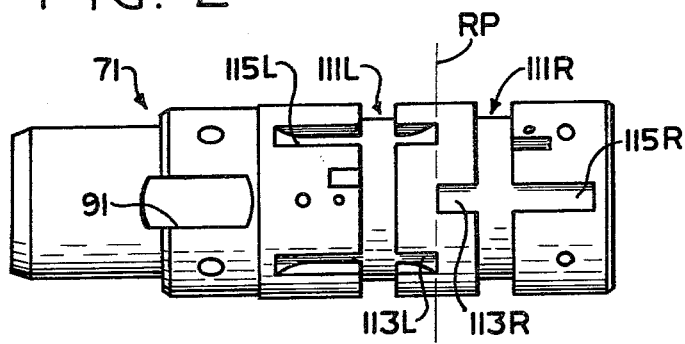
FIG. 3 is an elevation of the primary valve member (spool), on the same scale as FIG. 2.
Figure 4:
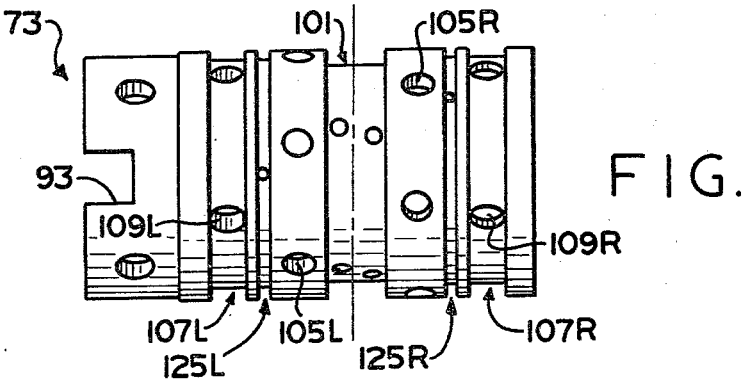
FIG. 4 is an elevation of the follow-up valve member (sleeve), on the same scale as FIG. 2.

Referring now to FIG. 3, in conjunction with FIGS. 2 and 7, it may be seen that the valve spool 71 defines a pair of circumferential meter grooves 111L and 111R, equally and oppositely disposed about the reference plane RP, and disposed to be axially aligned with the meter ports 105L and 105R, respectively. It should be noted that when the valve sleeve 73 is disposed about the valve spool 71, the sleeve 73 and spool 71 will be in the same axial relationship as is represented by FIGS. 3 and 4. In fluid communication with the meter groove 111L is a plurality of pressure passages 113L which terminate at approximately the reference plane RP. Similarly, in fluid communication with the meter groove 111R is a plurality of pressure passages 113R which also terminate at approximately the reference plane RP.

Also in fluid communication with the meter groove 111L is a plurality of operating passages 115L, which extend axially a sufficient distance to communicate with the adjacent operating ports 109L. Similarly, in fluid communication with the meter groove 111R is a plurality of operating passages 115R, which extend axially a sufficient distance to communicate with the adjacent operating ports 109R. It should be noted that for ease of manufacture, the operating passages 115L and 115R are in circumferential alignment with the pressure passages 113L and 113R, respectively.

In addition to the above-described grooves and passages formed on the outer surface of the valve spool 71, there is a plurality of tank ports 117L, alternately disposed between operating passages 115L, and a plurality of tank ports 117R, alternately disposed between operating passages 115R. Each of the tank ports 117L and 117R is disposed to be aligned with, and in fluid communication with, one of the operating ports 109L and 109R, respectively, when the spool and sleeve are relatively displaced from the neutral position. The tank ports 117L and 117R are in fluid communication with the interior of the valve spool 71, so that return fluid passes through either set of tank ports, 117L or 117R, then through the interior of the spool 71 and radially outward through the spring openings 91 and 93 into the annular groove 63 which communicates with the fluid return port 23.

It is believed that the basic operation of the controller valving described thus far should be readily apparent in view of the teachings of the cited patent, U.S. Pat. No. 4,033,377. However, a partial description of the operation of the controller valving will be provided, partly to relate the structure illustrated in FIGS. 2–4 and 7–10 to the schematic of FIG. 1. Referring now to FIGS. 1 and 9, when steering is initiated (assume clockwise rotation of the spool 71 as viewed from the left in FIG. 2, and downward movement of the spool 71 in FIG. 9), each of the pressure passages 113L begins to communicate with the adjacent pressure port 103L, defining a flow area therebetween. The composite of all of these individual orifices formed between the passages 113L and pressure ports 103L comprises the main flow control orifice 35 of FIG. 1. Accordingly, it should be apparent that the particular number of each of the ports and passages forms no part of the present invention, and the selection of the number of ports and passages to be used is related to such factors as the physical size of the spool and sleeve, and the desired flow capacity through the controller. Inlet fluid flowing through the pressure ports 103L and into the pressure passages 113L then flows into the meter groove 111L, and into the meter ports 105L. Each of the meter ports 105L commutates with one of the meter passages 97 to define a flow orifice therebetween. The composite of the orifices formed between the meter ports 105L and the meter passages 97 comprises the second variable orifice 37 of FIG. 1. The fluid flowing into the meter passages 97 flows through the axial bores 95 to the expanding volume chambers of the fluid meter 39. Metered fluid exhausted from the contracting volume chambers of the meter 39 flows through the other of the axial bores 95, into the respective meter passages 99 which commutate with the meter ports 105R to define flow orifices therebetween. The composite of the orifices formed between the meter passages 99 and the meter ports 105R comprises the third variable orifice 41 of FIG. 1. The metered fluid flows from the meter ports 105R into the meter groove 111R, then into the operating passages 115R. Each of the passages 115R is in communication with one of the operating ports 109R, the composite of all of the orifices formed between the passages 115R and ports 109R comprising the fourth variable orifice 43. The metered fluid then flows to the control port 25, then to the cylinder 17, with the displaced fluid returning to the control port 27, then to the operating ports 109L which are in communication with the tank ports 117L, the composite of the orifices formed between the ports 109L and the ports 117L comprising the fifth variable orifice 45 of FIG. 1. Return fluid in the tank ports 117L then flows as described previously to the return port 23, and to the reservoir.

Load Sensing Circuit

As may be seen schematically in FIG. 1, the controller 15 provides an alternate flow path for pressurized fluid entering the inlet port 21, in parallel with the main flow path (just described) through the main flow control orifice 35. This alternate path includes a fixed bleed orifice 119, through which a small volume of fluid is communicated from the main flow path, upstream of the main flow control orifice 35, into a load sensing circuit, which will now be described in detail. It should be noted that the schematic representation of the load sensing circuit is the same as that shown in copending U.S. Application Ser. No. 875,714, filed Feb. 6, 1978, also in the name of Oliver W. Johnson, and assigned to the assignee of the present invention.

Figure 5:
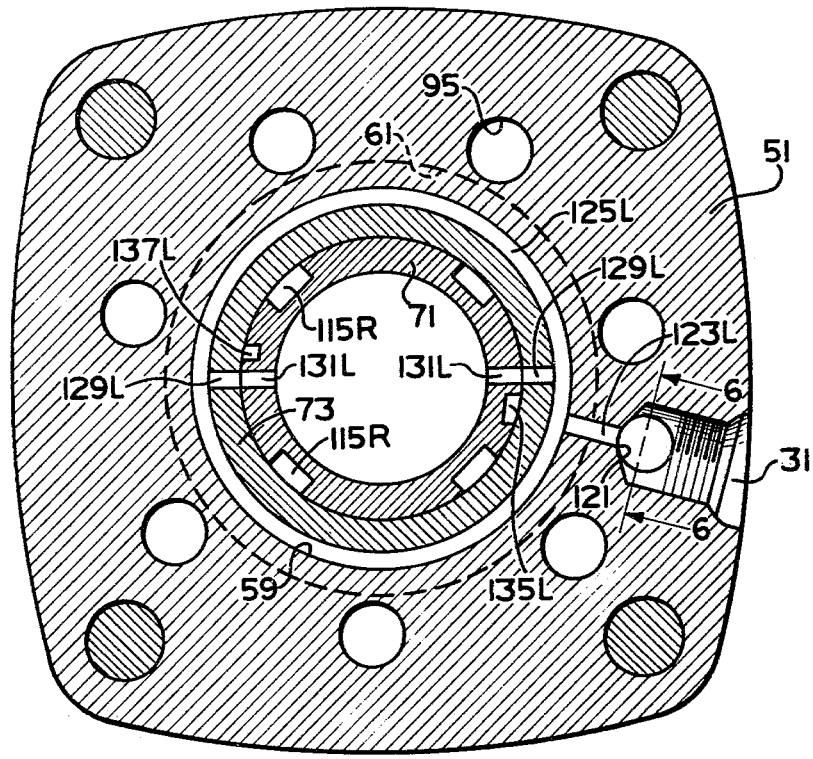
FIG. 5 is a transverse cross section taken on line 5—5 of FIG. 2, but on a larger scale.
Figure 6:
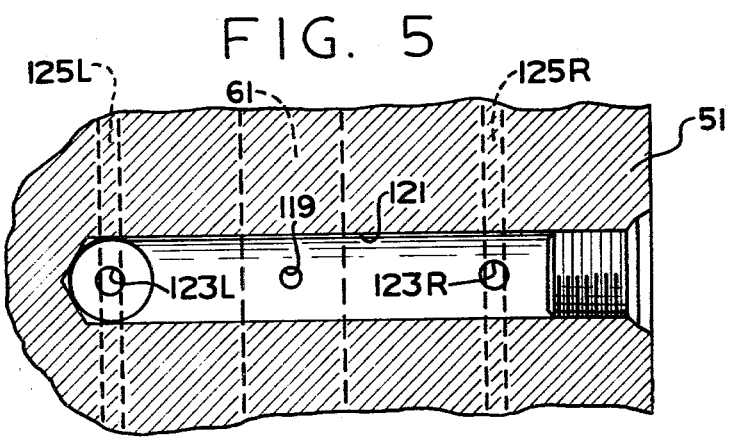
FIG. 6 is an enlarged, axial cross section taken on line 6—6 of FIG. 5.

Referring to FIGS. 5 and 6, in conjunction with FIGS. 1–4, the small volume of inlet fluid which flows from the annular groove 61 through the fixed bleed orifice 119 enters an axial bore 121 defined by the valve housing 51. The axial bore 121 is in open fluid communication with the load sensing port 31. In addition, the axial bore 121 is in fluid communication, through a pair of orifices 123L and 123R, with a pair of load sensing grooves 125L and 125R, respectively the grooves 125L and 125R being formed on the outer surface of the valve sleeve 73. It should be apparent to those skilled in the art that the supply of load signal fluid may be fed to the load sensing grooves 125L and 125R in a manner different that than shown. However, the arrangement shown results in relatively simple machining of the valve housing 51 and provides load signal fluid at a closely controlled pressure level. It should be noted that the orifices 123L and 123R are relatively larger than the fixed bleed orifice 119, such that the fluid pressure in the load sensing grooves 125L and 125R will be substantially the pressure of the signal transmitted from the load sensing port 31 to the appropriate pressure responsive means. In the embodiment of FIG. 1, the pressure responsive means is the flow control valve 13, whereas in the schematic of FIGS. 8 and 10, the pressure responsive means comprises a load sensing pump 127.

As may best be seen in FIG. 5, the load sensing groove 125L is in continuous fluid communication with a pair of radial bores 129L, formed in the valve sleeve 73. Similarly, the load sensing groove 125R is in continuous fluid communication with a pair of radial bores 129R, formed in the sleeve 73. It should be noted that the load sensing grooves 125L and 125R, and therefore the radial bores 129L and 129R are oppositely and equally disposed about the reference plane RP, as are the various other ports and grooves previously described. The valve spool 71 defines a pair of radial bores 131L which are aligned with the radial bores 129L (see FIG. 5), when the spool 71 and sleeve 73 are in the neutral position. Similarly, the spool 71 defines a pair of radial bores 131R which are aligned with the radial bores 129R when the spool and sleeve are in the neutral position. The communication between each of the radial bores 131L or 131R and its respective radial bore 129L or 129R forms a variable orifice, the composite of these variable orifices comprising a variable neutral orifice 133 (see FIG. 1). The function of the neutral variable orifice 133 is to variably restrict the flow of load signal fluid to the reservoir when the spool and sleeve are at, or adjacent, the neutral position.

Much of the subsequent discussion will relate to variations in the "load signal level" caused by the operation of the present invention. It should be understood that the term "load signal level" does not refer to the actual fluid pressure present at the load signal port 31, but rather, to the difference between the steering load and the load signal pressure. This difference is typically referred to as the stand-by pressure when the valving is in its neutral position. Thus, the stand-by pressure denotes the difference between reservoir pressure, and the pressure at the output of the variable fluid source. When the valving is shifted away from neutral, the difference between the steering load and the load signal pressure is typically referred to as the differential operating pressure. However, the term load signal level will be used hereinafter to cover both the neutral and operating conditions, in view of the variable and synthetic nature of the load signal of the present invention.

Because high pressure fluid is constantly being bled into the load sensing circuit through the fixed bleed orifice 119, it should be apparent that the fluid pressure in the load sensing circuit, and at the load signal port 31, is directly related to the area of any orifices which permit fluid to escape from the load sensing circuit, either to tank or to the main flow path. Therefore, when the valve members are in the neutral position, and the neutral variable orifice 133 has its maximum flow area, the load signal level is at a minimum, but as the valve members are relatively displaced away from the neutral position, the flow area of the neutral orifice 133 decreases, and the load signal level increases.

Referring now primarily to FIGS. 5, 7, and 8, there is a primary load sensing slot 135L in fluid communication with the meter groove 111L, near one of the radial bores 131L. Similarly, there is a primary load sensing slot 135R in fluid communication with the meter groove 111R, near one of the radial bores 131R. Disposed near the other of the radial bores 131L is a secondary load sensing slot 137L, also in fluid communication with the meter groove 111L. Similarly, near the other of the radial bores 131R is a secondary load sensing slot 137R, also in fluid communication with the meter groove 111R.

For purposes of the subsequent description, reference will be made primarily to FIG. 11, which is an enlarged, fragmentary view illustrating different relative displacements of the valve members which will result in different load signal levels. FIG. 11(A) corresponds to FIG. 7, with the valve members being in the neutral position. The radial bores 129L are circumferentially displaced from the primary and secondary load sensing slots 135L and 137L, but are aligned with the radial bores 131L (not seen in FIG. 11(A)), such that the neutral orifice 133 is at its maximum flow area as described previously.

FIG. 11(B) illustrates the valving after several degrees of relative displacement between the spool and sleeve. In the position of FIG. 11(B), the neutral orifice 133 (the flow area between the radial bores 129L and the radial bores 131L) has substantially decreased and is approaching zero. At the same time, one of the radial bores 129L is beginning to communicate with the primary load sensing slot 135L to define therebetween a primary operating orifice 141 (see FIG. 1). Similarly, the other radial bore 129L is beginning to communicate with the secondary load sensing slot 137L to define therebetween a secondary operating orifice 143 (see FIG. 1). It should be noted that when the valve members were in the neutral position, and the radial bores 129L and 131L were aligned, to define a maximum flow area, the radial bores 129R and 131R were also aligned to define a maximum flow area. Therefore, the effective area of the neutral orifice 133 was four times the area of any one of the bores 129L or 129R. Similarly, as the flow area between the radial bores 129L and radial bores 131L decreases toward zero, the flow area between the radial bores 129R and 131R is also decreasing towards zero. However, in the position of FIG. 11(B), while the radial bores 129L are beginning to communicate with the load sensing slots 135L and 137L, the radial bores 129R are now blocked from fluid communication by the outer surface of the valve spool 71 (see FIG. 9). Accordingly, the total flow area permitting fluid to "escape" from the load sensing circuit is never as great when the valve members are in the operating position as when they are in the neutral position.

In FIG. 11(C), which corresponds to FIG. 9, after several additional degrees of relative displacement between the spool and sleeve, the radial bores 129L are fully communicating with the primary and secondary load sensing slots 135L and 137L. In this position of the valve members, the primary and secondary operating orifices 141 and 143 have reached their maximum flow areas, which are then maintained over a range of several degrees of relative displacement between the spool and sleeve. It should be noted that the position illustrated in FIG. 11 (C) is a relative displacement corresponding to a normal rate of rotation of a steering wheel.

Referring now to FIG. 11(D), the illustrated displacement of the spool and sleeve (probably about 12-15 degrees) corresponds to a faster rotation of the steering wheel. In the position shown, the one radial bore 129L is still fully communicating with the primary load sensing slot 135L, such that the primary operating orifice 141 still has a maximum flow area. However, the other radial bore 129L is no longer fully communicating with the secondary load sensing slot 137L, such that the flow area of the secondary operating orifice 143 has substantially decreased, and is approaching zero. It should be apparent that, as the area of the secondary orifice 143 decreases, the cummulative area of the orifices 141 and 143 is also decreasing, and the load signal level is rising proportionately.

From the position shown in FIG. 11(D), after perhaps one or two degrees of additional relative displacement between the spool and sleeve (corresponding to a "full actuated condition"), the area of the secondary orifice 143 is zero, and the load signal level reaches a maximum. As is generally understood by those skilled in the art, the rate of fluid flow through a steering control unit is somewhat limited by the amount of effort required to turn the wheel. However, using the present invention results in a higher load signal level at the fully actuated steering rate, which results in a higher pressure drop across the main flow control orifice 35. This higher pressure drop results in a tendency for a greater flow through the orifice 35, which tends to turn the fluid meter 39 at a faster rate, permitting faster turning of the steering wheel, with about the same amount of effort.

What is claimed is:

1. A controller operable to control the flow of fluid from a source of pressurized fluid to a fluid pressure operated device, the source of fluid including pressure responsive means for varying the delivery of fluid to said controller, said controller comprising:
   (a) housing means including an inlet port for connection to the source of fluid, a return port for connection to a reservoir, first and second control fluid ports for connection to the fluid pressure operated device, and a load signal port for connection to the pressure responsive means;
   (b) valve means disposed in said housing means including a primary rotatable valve member and a cooperating relatively rotatable follow-up valve member, said valve members defining a neutral position and a central reference plane disposed perpendicular to the axes of rotation of said valve members;
   (c) means for imparting follow-up movement to said follow-up valve member in response to the flow of fluid to or from the fluid pressure operated device;
   (d) means coupling said follow-up valve member to said primary valve member for limited movement relative to said neutral position and for common rotary movement therewith;
   (e) said primary and follow-up valve members cooperating with said housing means to define a first plurality of fluid passages connecting said inlet port and said first control fluid port when said valve members are relatively displaced in one direction from said neutral position and a second plurality of fluid passages connecting said inlet port and said second control fluid port when said valve members are relatively displaced in the other direction from said neutral position, said first and second pluralities of fluid passages being arranged to provide substantially the same restriction to fluid flow between said inlet port and said control fluid ports in either direction of relative displacement from said neutral position;
   (f) said first and second pluralities of fluid passages including first and second main flow control orifices, respectively, each of said orifices having a substantially zero flow area when said valve members are in said neutral position and an increasing flow area as said valve members are displaced from said neutral position;
   (g) said valve means and said housing means cooperating to define a load signal chamber in continuous fluid communication with said load signal port;
   (h) means operable to communicate fluid pressure from upstream of said first and second main flow control orifices to said load signal chamber; and
   (i) said valve means including means to variably restrict the flow of fluid from said load signal chamber to said first plurality of fluid passages, downstream of said first main flow control orifice, when said valve members are relatively displaced in said one direction, and to said second plurality of fluid passages, downstream of said second main flow control orifice, when said valve members are relatively displaced in said other direction.

2. A controller as claimed in claim 1 wherein said load signal chamber includes first and second load signal grooves operable to be in fluid communication with said first and second pluralities of fluid passages, respectively, when said valve members are relatively displaced in said one and said other directions, respectively.

3. A controller as claimed in claim 2 wherein said variable restricting means includes first and second operating orifice means communicating between said first and second load signal grooves and said first and second pluralities of fluid passages, respectively, when said valve members are relatively displaced in said one and said other directions, respectively.

4. A controller as claimed in claim 3 wherein said first and second operating orifice means are blocked from communication with said first and second pluralities of fluid passages, respectively, when said valve members are in said neutral position.

5. A controller as claimed in claim 4 wherein said valve means includes first and second neutral orifice means operable to communicate between said first and second load signal grooves, respectively, and the reservoir, when said valve members are in said neutral position.

6. A controller as claimed in claim 5 wherein the flow areas of said first and second neutral orifice means are greater than the flow areas of said first and second operating orifice means to provide a fluid pressure in said load signal chamber at a lower level when said valve members are in said neutral position than when said valve members are displaced from said neutral position.

7. A controller as claimed in claim 3 wherein said valve members, when relatively displaced from said neutral position, define selectively, a normal operating position and a fully actuated position, said first and second operating orifice means having one flow area when said valve members define said normal operating position and another flow area when said valve members define said fully actuated position.

8. A controller as claimed in claim 7 wherein said one flow area is greater than said another flow area to provide a fluid pressure in said load signal chamber at a lower level when said valve members define said normal operating position than when said valve members define said fully actuated position.

9. A controller operable to control the flow of fluid from a source of pressurized fluid to a fluid pressure operated device, the source of fluid including pressure responsive means for varying the delivery of fluid to said controller, said controller comprising:
    (a) housing means including an inlet port for connection to the source of fluid, a return port for connection to a reservoir, first and second control fluid ports for connection to the fluid pressure operated device, and a load signal port for connection to the pressure responsive means;
    (b) valve means disposed in said housing means including a primary rotatable valve member and a cooperating relatively rotatable follow-up valve member, said valve members defining a neutral position and a central reference plane disposed perpendicular to the axes of rotation of said valve members;
    (c) means for imparting follow-up movement to said follow-up valve member in response to the flow of fluid to or from the fluid pressure operated device;
    (d) means coupling said follow-up valve member to said primary valve member for limited movement relative to said neutral position and for common rotary movement therewith;
    (e) said primary and follow-up valve members cooperating with said housing means to define a first plurality of fluid passages connecting said inlet port and said first control fluid port when said valve members are relatively displaced in one direction from said neutral position and a second plurality of fluid passages connecting said inlet port and said second control fluid port when said valve members are relatively displaced in the other direction from said neutral position, said first and second pluralities of fluid passages being arranged to provide substantially the same restriction to fluid flow between said inlet port and said control fluid ports in either direction of relative displacement from said neutral position;
    (f) said first and second pluralities of fluid passages including first and second main flow control orifices, respectively, each of said orifices having a substantially zero flow area when said valve members are in said neutral position and an increasing flow area as said valve members are displaced from said neutral position;
    (g) said valve means and said housing means cooperating to define a load signal chamber in continuous fluid communication with said load signal port;
    (h) means operable to communicate fluid pressure from upstream of said first and second main flow control orifices to said load signal chamber; and
    (i) said load signal chamber including first and second load sensing grooves defined by said housing means and said follow-up valve member, said first and second load sensing grooves being oppositely and approximately equally disposed about said central reference plane.

10. A controller as claimed in claim 9 wherein said first and second pluralities of fluid passages include pressure port means defined by said follow-up valve member and disposed adjacent said central reference plane, first and second meter grooves defined by said primary valve member and oppositely and approximately equally disposed about said central reference plane, and first and second axial pressure passages communicating with said first and second meter grooves, respectively and extending a sufficient distance axially toward said reference plane to communicate with said pressure port means when said valve members are relatively displaced in said one direction and said other direction, respectively.

11. A controller as claimed in claim 10 wherein said first and second load sensing grooves are disposed at a greater axial distance from said reference plane than said first and second meter grooves respectively.

12. A controller as claimed in claim 11 wherein said follow-up valve member defines first and second radial bores communicating with said first and second load sensing grooves, respectively, and said primary valve member defines first and second load sensing slots communicating with said first and second meter grooves, respectively, said first and second load sensing slots extending a sufficient distance axially to communicate with said first and second radial bores when said valve members are relatively displaced in said one direction and said other direction, respectively.

13. A controller as claimed in claim 12 wherein said primary valve member defines first and second neutral openings operable to communicate between said first and second radial bores, respectively, and the interior of said primary valve member when sid valve members are in said neutral position, the interior of said primary valve member being in fluid communication with said return port.

14. A controller as claimed in claim 12 wherein said follow-up valve member defines third and fourth radial bores communicating with said first and second load sensing grooves, respectively, and said primary valve member defines third and fourth load sensing slots communicating with said first and second meter grooves, respectively, said third and fourth load sensing slots extending a sufficient distance axially to communicate with said third and fourth radial bores when said valve members are relatively displaced in said one direction and said other direction, respectively.

15. A controller as claimed in claim 14 wherein said valve members, when relatively displaced from said neutral position in either direction, define selectively, a normal operating position and a fully actuated position, said first and second load sensing grooves having relatively greater circumferential extent than said third and fourth load sensing grooves, whereby said first and third radial bores communicate with said first and third load sensing grooves, respectively, when said valve members are relatively displaced in said one direction to said normal operating position, whereas said first radial bore communicates with said first load sensing groove, while said third radial bore is beyond communication with said third load sensing groove when said valve members are relatively displaced in said one direction to said fully actuated position.

* * * * *